United States Patent
Ehira

(10) Patent No.: US 12,395,601 B2
(45) Date of Patent: Aug. 19, 2025

(54) ELECTRONIC APPARATUS, METHOD OF CONTROLLING THE SAME, AND COMPUTER-READABLE STORAGE MEDIUM STORING PROGRAM

(71) Applicant: CANON KABUSHIKI KAISHA, Tokyo (JP)

(72) Inventor: Tatsuya Ehira, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 271 days.

(21) Appl. No.: 18/172,222

(22) Filed: Feb. 21, 2023

(65) Prior Publication Data

US 2023/0276015 A1     Aug. 31, 2023

(30) Foreign Application Priority Data

Feb. 28, 2022     (JP) ................... 2022-029380

(51) Int. Cl.
*H04N 5/262*     (2006.01)
(52) U.S. Cl.
CPC .................. *H04N 5/2624* (2013.01)
(58) Field of Classification Search
CPC .................................................. H04N 5/2624
See application file for complete search history.

(56) References Cited

U.S. PATENT DOCUMENTS

2017/0094189 A1*   3/2017   Ogawa ................ H04N 23/667

FOREIGN PATENT DOCUMENTS

| JP | 2009188800 A | 8/2009 |
|----|--------------|--------|
| JP | 2015043557 A | 3/2015 |

* cited by examiner

*Primary Examiner* — Lin Ye
*Assistant Examiner* — Fayez A Bhuiyan
(74) *Attorney, Agent, or Firm* — Canon U.S.A., Inc. IP Division

(57) ABSTRACT

An electronic apparatus including a plurality of lenses acquires a first captured image captured using a first lens, acquires a second captured image captured using a second lens, acquires a third captured image captured using a third lens, superimposes the second captured image on the first captured image, detects an object from the first captured image, generates a combined image where the second captured image is superimposed on the first captured image in a case where a region of the detected does not overlap with a region where the second captured image is superimposed, and generates a combined image where the second captured image is superimposed on the third captured image in a case where the region of the detected object overlaps with the region where the second captured image is superimposed.

10 Claims, 8 Drawing Sheets

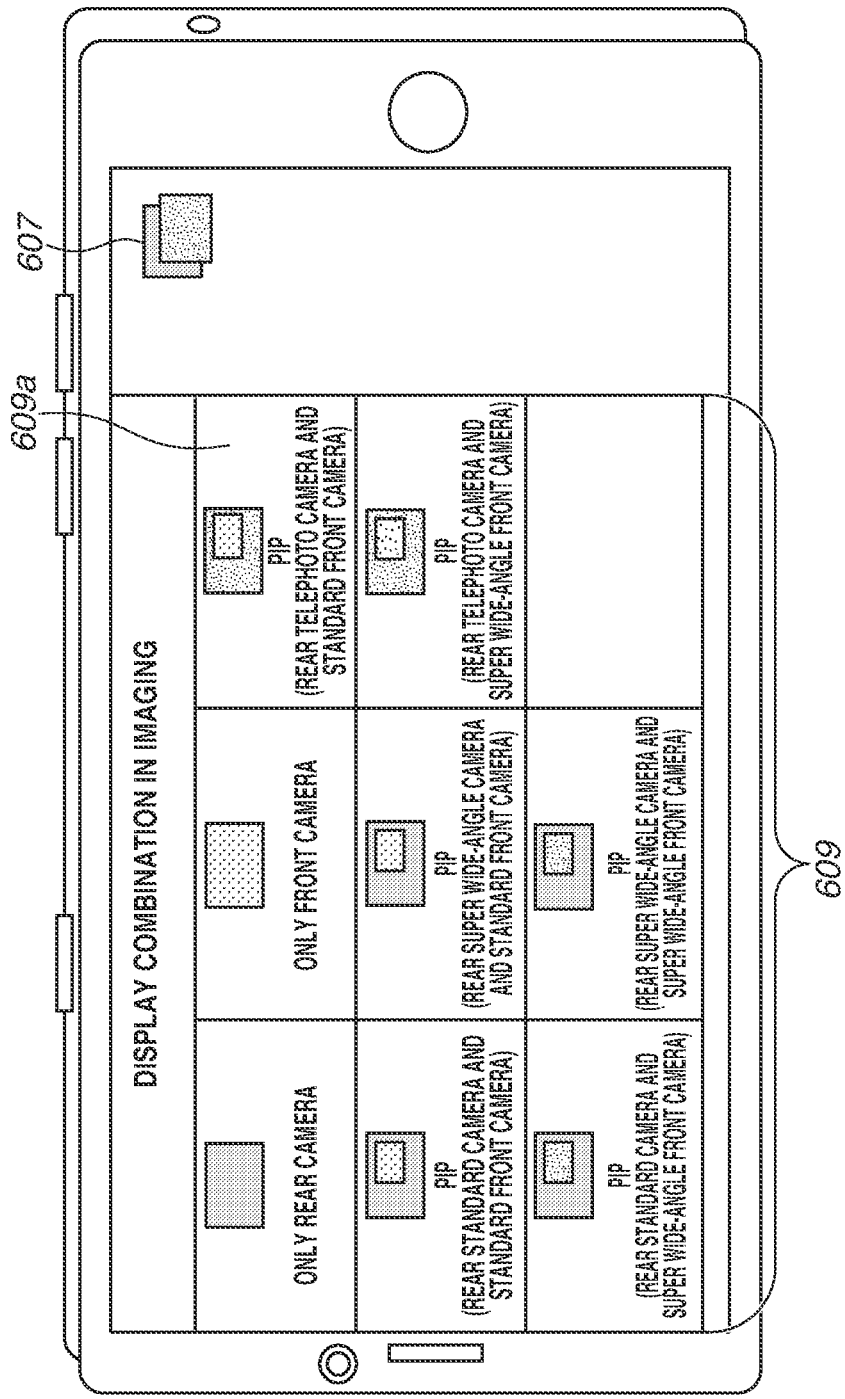

ELECTRONIC APPARATUS, METHOD OF CONTROLLING THE SAME, AND COMPUTER-READABLE STORAGE MEDIUM STORING PROGRAM

BACKGROUND

Field

The present disclosure relates to an electronic apparatus, a method of controlling the electronic apparatus, and a computer-readable storage medium storing a program.

Description of the Related Art

There is an imaging method of superimposing and combining one of a plurality of captured images with another captured image and outputting a resultant image (picture-in-picture, hereinafter, also referred to as PIP). PIP imaging is used for still image capturing as well as for various scenes such as distribution of a moving image or a live video, video display in a web conference, and television video.

In recent years, development of a smartphone has progressed, and most smartphones include a camera including a plurality of lenses different in angle of view such as a wide-angle lens, a standard lens, and a telephoto lens. Some smartphones have, as a camera function, a function of displaying/recording captured images by the plurality of lenses in a PIP mode.

When imaging/display in the PIP mode is performed using an electronic apparatus represented by the smartphone, display of an object in a captured image and display of a captured image to be superimposed (hereinafter, also referred to as PIP window) overlap with each other to deteriorate visibility in some cases.

Japanese Patent Application Laid-Open No. 2009-188800 discusses an image display apparatus that detects an object and moves a position of the PIP window when the object is moved toward the PIP window.

In Japanese Patent Application Laid-Open No. 2009-188800, however, the PIP window may overlap with the object even after the PIP window is moved. For example, as discussed in Japanese Patent Application Laid-Open No. 2015-043557, a zoom magnification is changed and an angle of view is narrowed to largely image an object in some cases. In such a case, even after the PIP window is moved, the PIP window can possibly overlap with the object, which could result in some deterioration in visibility of the object.

For example, in a case where a photographer performs live distribution, the photographer hosts a distribution program and operates a camera or a smartphone used for distribution as well. The photographer checks a captured state of the object and the PIP window point by point, and if the object and the PIP window overlap with each other, it is necessary for the photographer to suspend recording or distribution of the moving image and to change an angle of view and a position of the camera. For this reason, the photographer cannot concentrate on imaging/distribution (e.g., host of distribution program).

SUMMARY

Aspects of the present disclosure are directed to, in a case where imaging is performed by an electronic apparatus including a plurality of lenses different in angle of view, and a captured image obtained using one lens is superimposed on a captured image obtained using another lens, a technique to prevent the captured image to be superimposed from overlapping with an object included in the other captured image.

An electronic apparatus includes a plurality of lenses, each having different angles of view, a processor, and a memory storing a program which, when executed by the processor, causes the electronic apparatus to acquire a first captured image captured using a first lens from among the plurality of lenses, acquire a second captured image captured using a second lens from among the plurality of lenses, wherein the second lens is different from the first lens, acquire a third captured image captured using a third lens from among the plurality of lenses, wherein the third lens is wider in angle of view than the first lens, superimpose the second captured image on the first captured image, detect an object from the first captured image, generate a combined image where the second captured image is superimposed on the first captured image in a case where a region of the detected object does not overlap with a region where the second captured image is superimposed, and generate a combined image where the second captured image is superimposed on the third captured image in a case where the region of the detected object overlaps with the region where the second captured image is superimposed.

Further features will become apparent from the following description of exemplary embodiments with reference to the attached drawings.

BRIEF DESCRIPTION OF THE DRAWINGS

FIGS. 6A and 6B are diagrams respectively illustrating a moving image capturing/recording screen and an image display setting screen.

DESCRIPTION OF THE EMBODIMENTS

An exemplary embodiment will be described with reference to drawings. In the present exemplary embodiment, a smartphone is described as an example of an electronic apparatus.

Figure 1A:
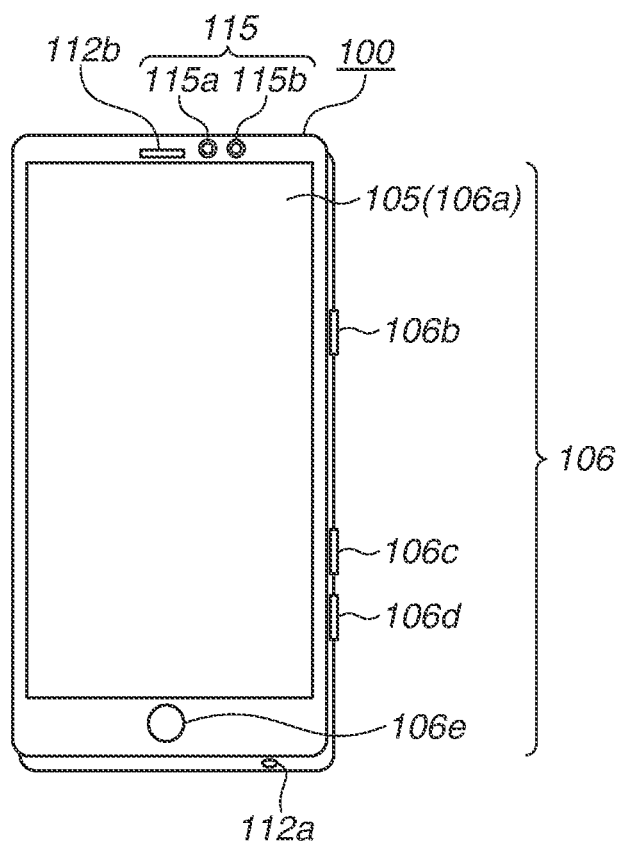
FIGS. 1A and 1B are diagrams of a smartphone.
Figure 1B:
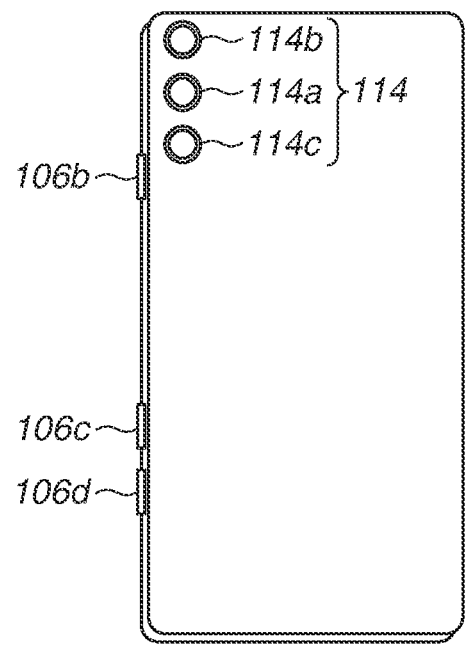

FIGS. 1A and 1B are diagrams of a smartphone 100. FIG. 1A is a front view of the smartphone 100 and FIG. 1B is a rear view of the smartphone 100.

The smartphone 100 includes a display 105, rear camera 114, and front camera 115.

The display 105 is a display unit provided on a front surface of the smartphone 100 and configured to display an image and various kinds of information. The smartphone can display a live-view image (LV) image captured by the rear camera 114 or the front camera 115 on the display 105. The rear camera 114 includes a rear telephoto camera 114a, a rear standard camera 114b, and a rear super wide-angle camera 114c. The front camera 115 includes a front standard camera 115a and a front super wide-angle camera 115b.

The smartphone 100 includes an operation unit 106. The operation unit 106 includes a touch panel 106a, a power button 106b, a volume plus button 106c, a volume minus button 106d, and a home button 106e.

The touch panel 106a is a touch operation member and can detect touch operation on a display surface (operation surface) of the display 105. The power button 106b is an operation member, and can switch lighting on/off of the display 105. When the power button 106b is continuously depressed (depressed long) for a certain time, for example, for three seconds, the smartphone 100 can be switched on or off. The volume plus button 106c and the volume minus button 106d are volume buttons for controlling volume of sound output from a sound output unit 112 described below. When the volume plus button 106c is depressed, the volume is turned up, and when the volume minus button 106d is depressed, the volume is turned down. In an imaging standby state during use of the camera, the volume plus button 106c and the volume minus button 106d function as a shutter button for instructing imaging in response to depression. A user can perform optional setting such that a specific function is executed in a case where the power button 106b and the volume minus button 106d are simultaneously depressed or in a case where the volume minus button 106d is quickly depressed several times.

The home button 106e is an operation button to display, on the display 105, a home screen that is a startup screen of the smartphone 100. When the home button 106e is depressed while various applications are started up and used in the smartphone 100, the various applications can be temporarily closed and the home screen can be displayed. The home button 106e is assumed to be a physically-depressible button. The home button 106e may not be a physical button, and can be a touchable button that has a similar function and is displayed on the display 105.

The smartphone 100 includes a sound output terminal 112a and a speaker 112b. The sound output terminal 112a is an earphone jack, and outputs sound to an earphone, an external speaker, or the like. The speaker 112b is a built-in speaker outputting sound. In a case where sound is output from the smartphone 100 while a terminal outputting the sound, for example, an earphone cord is not attached to the sound output terminal 112a, the sound is output from the speaker 112b.

Figure 2:
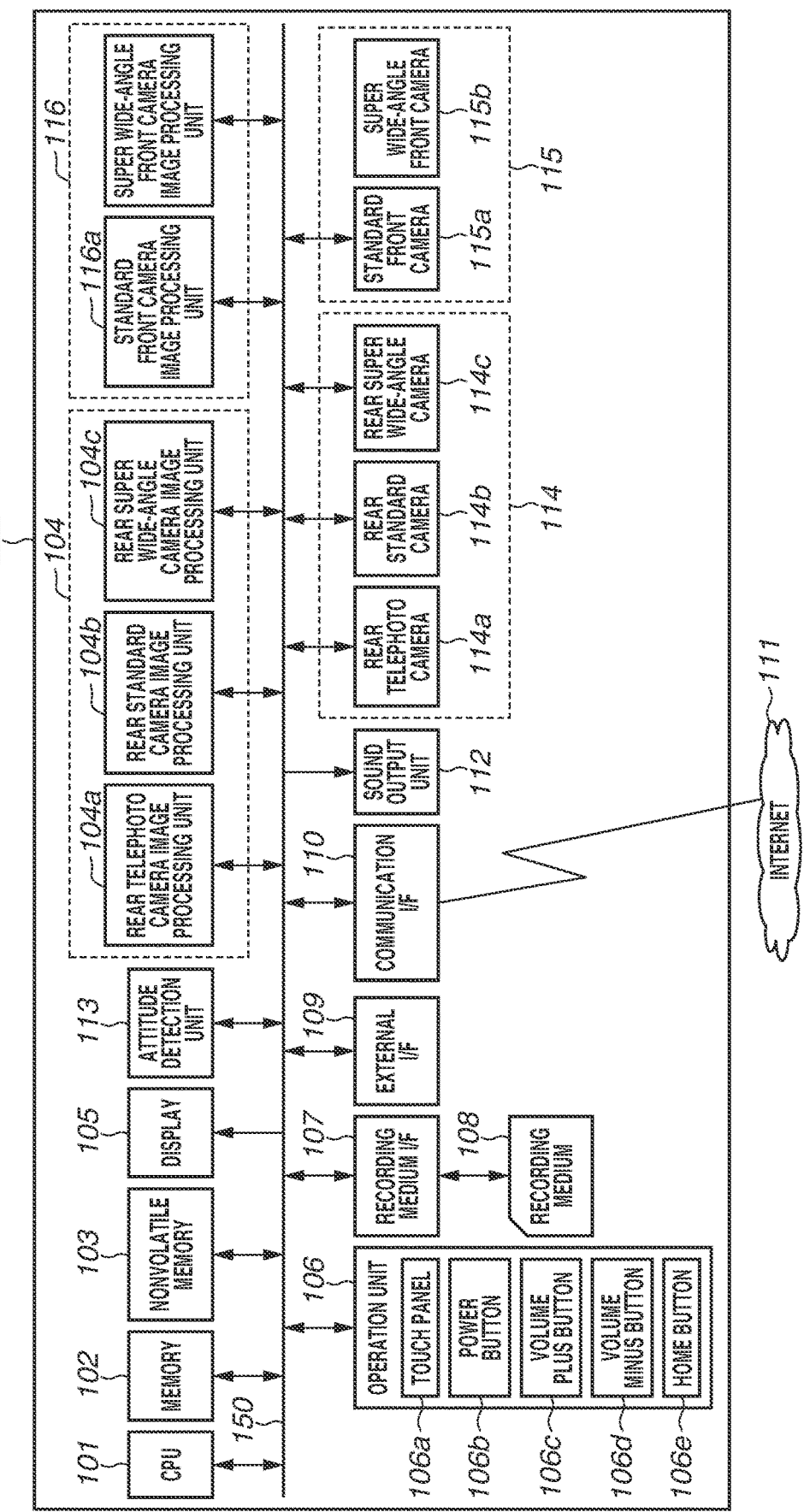
FIG. 2 is a block diagram illustrating a configuration of the smartphone.

FIG. 2 is a block diagram illustrating a configuration example of the smartphone 100. In FIG. 2, components that are the same as the components in FIGS. 1A and 1B are denoted by the same reference numerals.

In the smartphone 100, a central processing unit (CPU) 101, a memory 102, a nonvolatile memory 103, a rear camera image processing unit 104, the display 105, the operation unit 106, a recording medium interface (I/F) 107, an external I/F 109, and a communication I/F 110 are connected to an internal bus 150.

In the smartphone 100, the sound output unit 112, an attitude detection unit 113, the rear camera 114, the front camera 115, and an camera image processing unit 116 are also connected to the internal bus 150. The units connected to the internal bus 150 can mutually exchange data via the internal bus 150.

The CPU 101 is a control unit for controlling the smartphone 100 and includes at least one processor or circuit. The memory 102 includes, for example, a random access memory (RAM such as volatile memory using semiconductor device). The CPU 101 controls each of the units in the smartphone 100 using the memory 102 as a work memory based on programs stored in, for example, the nonvolatile memory 103. The nonvolatile memory 103 stores image data, sound data, other data, various kinds of programs for operation of the CPU 101, and the like. The nonvolatile memory 103 includes, for example, a flash memory or a read only memory (ROM).

The rear camera image processing unit 104 performs various kinds of image processing and object recognition processing on an image captured by the rear camera 114 under the control of the CPU 101. A rear telephoto camera image processing unit 104a, a rear standard camera image processing unit 104b, and a rear super wide-angle camera image processing unit 104c are respectively provided for the rear telephoto camera 114a, the rear standard camera 114b, and the rear super wide-angle camera 114c. Each of the image processing units performs processing on an image captured by the corresponding camera. In the present exemplary embodiment, each of the three rear cameras has a respective image processing unit. The image processing units are not necessarily individually provided for the three rear cameras. Any two of the three rear cameras can share one image processing unit, or the three rear cameras can share one image processing unit.

The front camera image processing unit 116 performs various kinds of processing and object recognition processing on an image captured by the front camera 115. Each of the image processing units can also perform various kinds of image processing on an image stored in the nonvolatile memory 103 or a recording medium 108, a video signal acquired through the external I/F 109, an image acquired via the communication I/F 110, and the like. The image processing performed by each of the image processing units includes an analog-to-digital (A/D) conversion processing, digital-to-analog (D/A) conversion processing, encoding processing, compression processing, decoding processing, enlargement/reduction processing (resizing processing), noise reduction processing, color conversion processing, and the like of image data. Each of the image processing units can include a dedicated circuit block performing specific image processing. The rear camera image processing unit 104 can be united as one processing block, and can exclusively process images of the respective cameras by using parallel processing or time-division processing. Depending on a type of image processing, the CPU 101 can perform the image processing based on the programs without using the image processing units.

The display 105 displays an image, a graphical user interface (GUI) screen configuring a GUI, and the like under the control of the CPU 101. The CPU 101 controls the units of the smartphone 100 to generate a display control signal, to generate a video signal to be displayed on the display 105, and to output the video signal to the display 105, based on the programs. The display 105 displays a video based on the output video signal. The smartphone 100 itself can include an interface to output the video signal to be displayed on the display 105, and the display 105 can be an external monitor (e.g., television).

The operation unit 106 is an input device receiving user operation, and includes a character information input device such as a keyboard, a pointing device such as a mouse and a touch panel, buttons, a dial, a joystick, a touch sensor, and a touch pad. The touch panel is an input device that is planarly superimposed on the display 105 and outputs coordinate information on a touch position. The operation unit 106 includes the touch panel 106a, the power button 106b, the volume plus button 106c, the volume minus button 106d, and the home button 106e described above.

The recording medium 108 such as a memory card, a compact disc (CD), and a digital versatile disc (DVD) can be connected to the recording medium I/F 107. The recording medium I/F 107 reads out data from the connected recording medium 108 and writes data in the connected recording medium 108 under the control of the CPU 101. The recording medium 108 can be a built-in storage incorporated in the smartphone 100. The external I/F 109 is an interface that is connected to an external apparatus by a wired cable or radio and performs input/output of the video signal and the sound signal. The communication I/F 110 is an interface that communicates with the external apparatus, the Internet 111, and the like and transmits/receives various kinds of data such as a file and a command.

The sound output unit 112 outputs sound of a moving image and music data, operation sound, ringtone, various kinds of notification sound, and the like. The sound output unit 112 includes the sound output terminal 112a for connection of an earphone, and the speaker 112b, but sound can be output by wireless communication or the like.

The attitude detection unit 113 detects an attitude of the smartphone 100 in a gravity direction, and inclination of the attitude to axes of yaw, roll, and pitch. It is possible to determine whether the smartphone 100 is horizontally held, vertically held, directed upward, directed downward, inclined, or the like based on the attitude detected by the attitude detection unit 113. At least one of an acceleration sensor, a gyro sensor, a geomagnetic sensor, an azimuth sensor, or an altitude sensor can be used, or a plurality of sensors can be used in combination as the attitude detection unit 113.

The rear camera 114 is a camera disposed on a surface on a side opposite the display 105 in a housing of the smartphone 100. A focal length of the rear telephoto camera 114a is longer than a focal length of the rear standard camera 114b, and the rear telephoto camera 114a can perform imaging on a telephoto side compared with the rear standard camera 114b. A focal length of the rear super wide-angle camera 114c is shorter than the focal length of the rear standard camera 114b, and the rear super wide-angle camera 114c can perform imaging at a wide angle compared with the rear standard camera 114b. In other words, the focal length is shorter and the angle of view becomes greater in order of the rear telephoto camera 114a, the rear standard camera 114b, and the rear super wide-angle camera 114c. In the present exemplary embodiment, it is assumed that the rear telephoto camera 114a includes a lens of a mechanism optically zoomed to a predetermined magnification, but the rear telephoto camera 114a can include a lens of a mechanism with a magnification variable by the user. The front camera 115 is a camera disposed on the surface provided with the display 105 in the housing of the smartphone 100. A focal length of the front super wide-angle camera 115b is shorter than a focal length of the front standard camera 115a, and the front super wide-angle camera 115a can perform imaging at a wide angle as compared with the front standard camera 115a.

The rear telephoto camera 114a, the rear standard camera 114b, and the rear super wide-angle camera 114c can perform imaging operation at the same time. All of the three cameras do not necessarily perform the imaging operation at the same time. Any two of the three cameras can perform the imaging operation, or one of the three cameras can perform the imaging operation. Any of the LV images captured by the rear camera 114 and the front camera 115 can be displayed on the display 105. The camera to capture the image to be displayed on the display 105 can be selected by operation of the touch panel 106a. In other words, when the rear telephoto camera 114a is selected, an image enlarged more than an image by the rear standard camera 114b can be displayed on the display 105. When the rear standard camera 114b is selected, an image that is wider in angle of view than an image by the rear telephoto camera 114a and is enlarged more than an image by the rear super wide-angle camera 114c can be displayed. When the rear super wide-angle camera 114c is selected, an image wider in angle of view than both of the image by the rear telephoto camera 114a and the image by the rear standard camera 114b can be displayed. Alternatively, the photographer can select either imaging what the photographer sees or the photographer, depending on whether the rear camera 114 or the front camera 115 is used.

The operation unit 106 includes the touch panel 106a. The CPU 101 can detect the following operation on the touch panel 106a or states:

operation where a user's finger or a stylus that has not been in touch with the touch panel 106a newly touches the touch panel 106a, i.e., start of touch (hereinafter, referred to as "touch-down").

state where a user's finger or a stylus is in touch with the touch panel 106a (hereinafter, referred to as "touch-on").

operation where a user's finger or a stylus moves while being in touch with the touch panel 106a (hereinafter, referred to as "touch-move").

operation where a user's finger or a stylus that has been in touch with the touch panel 106a is removed from the touch panel 106a, i.e., end of touch (hereinafter, referred to as "touch-up").

state where nothing is in touch with the touch panel 106a (hereinafter, referred to as "touch-off").

When "touch-down" is detected, "touch-on" is also detected at the same time. Unless "touch-up" is detected after "touch-down", "touch-on" is normally continuously detected. When "touch-move" is detected, "touch-on" is also detected at the same time. When "touch-on" is detected but a touch position is not moved, "touch-move" is not detected. When "touch-up" of all of the user's fingers or the stylus that have been in touch with the touch panel 106a is detected, "touch-off" is detected.

The CPU 101 is notified of the operation/states and a coordinate of a position where the user's finger or the stylus is contacting the touch panel 106a via the internal bus 150. The CPU 101 determines what kind of operation (touch operation) has been performed on the touch panel 106a based on the information received by the CPU 101.

With respect to "touch-move", a moving direction of the user's finger or the stylus moving on the touch panel 106a can also be determined for a perpendicular component and a horizontal component on the touch panel 106a based on change in positional coordinate(s). In a case where "touch-move" of a predetermined distance or more is detected, it is determined that a slide operation has been performed. An operation where a user's finger is swiftly moved a certain distance across the touch panel 106a while the user's finger or stylus is contacting the touch panel 106a and the user's finger or stylus is then removed from the touch panel 106a is referred to as a "flick". In other words, the "flick" is operation of swiftly moving the user's finger or stylus over the touch panel 106a like a flip. When "touch-move" at a predetermined speed or more by a predetermined distance or more is detected, and then "touch-up" is detected, it can be determined that a flick operation has been performed (it can be determined that a flick operation has been performed subsequent to a slide operation). A touch operation of simultaneously touching a plurality of positions (e.g., two points) and bringing the touch positions close to each other is referred to as "pinch-in", and touch operation of moving the touch positions away from each other is referred to as "pinch-out". "Pinch-out" and "pinch-in" are collectively referred to as a pinch operation (or simply referred to as "pinch"). The touch panel 106a can be any type of a touch panel, such as a resistive film type, an electrostatic capacitance type, a surface acoustic wave type, an infrared-ray type, an electromagnetic induction type, an image recognition type, or an optical sensor type. While the above-description refers to a touch panel where detection that a touch operation has been performed is based on contact on the touch panel, any type of touch panel is applicable, such as a touch panel where detection that a touch operation has been performed is based on a proximity of the user's finger or stylus to the touch panel.

In the present exemplary embodiment, processing to display an object and a picture-in-picture (PIP) window and angle-of-view change processing at the moving image capturing/distribution by the smartphone 100 are described.

Figure 3A:
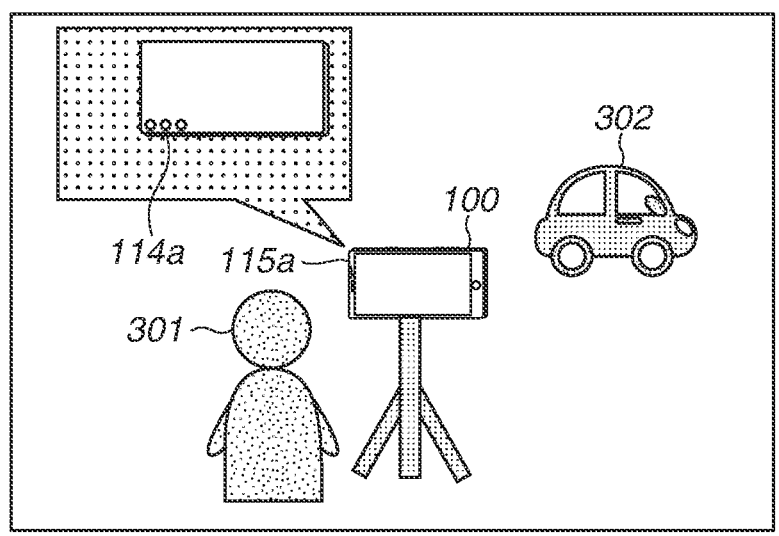
FIGS. 3A to 3C are diagrams illustrating issues that can be overcome according to an exemplary embodiment.
Figure 3B:
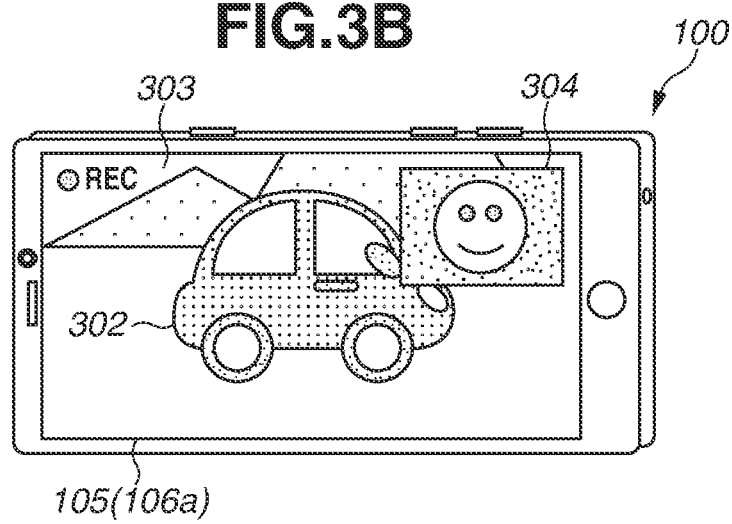
Figure 3C:
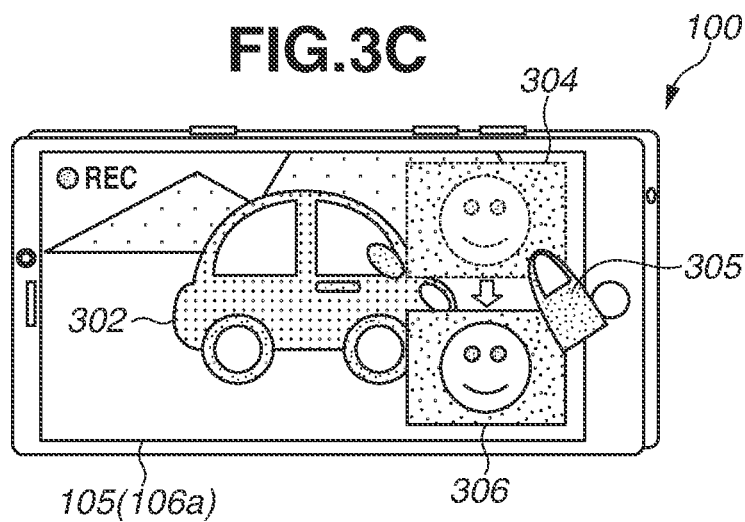

FIGS. 3A to 3C are diagrams illustrating issues to be solved by the present exemplary embodiment.

FIG. 3A illustrates, as an example of moving image recording or moving image distribution, a state where a photographer 301 images a facial expression of the photographer 301 using the front standard camera 115a of the smartphone 100 while imaging an object 302 using the rear telephoto camera 114a. It is assumed that the photographer 301 performs PIP imaging by superimposing an LV image acquired by the front standard camera 115a on an LV image acquired by the rear telephoto camera 114a.

The PIP imaging is not limited to a combination of the rear telephoto camera 114a and the front standard camera 115a, and can use any combination of the cameras of the rear camera 114 and the front camera 115.

FIG. 3B is a diagram illustrating an image displayed on the display 105 of the smartphone 100 in the imaging described with reference to FIG. 3A. An LV image 304 acquired by the front standard camera 115a is displayed in a PIP window on the display 105 by being superimposed on an LV image 303 acquired by the rear telephoto camera 114a. In FIG. 3B, the object 302 in the LV image 303 and the LV image 304 partially overlap each other, and the object 302 is partially hidden. Accordingly, the photographer 301 cannot check a captured state of the entire object 302. Thus, it is necessary for the photographer 301 to operate the smartphone 100 itself or the operation unit 106 to prevent overlapping.

FIG. 3C is a diagram illustrating operation to move the LV image 304 to be superimposed, in order to avoid overlapping of the object 302 and the LV image 304 having occurred in FIG. 3B. The photographer 301 operates the touch panel 106a of the smartphone 100 with a finger 305, to move the LV image 304 to another position 306. In a case where a region of the object 302 is large, however, the object 302 and the LV image 304 can overlap each other even though the photographer 301 moves the LV image 304 to the other position 306. It is necessary for the photographer 301 to suspend the imaging/distribution, and to avoid overlapping of the object 302 and the LV image 304 by operating the operation unit 106 of the smartphone 100. For this reason, the photographer 301 cannot concentrate on the imaging/distribution.

Figure 4:
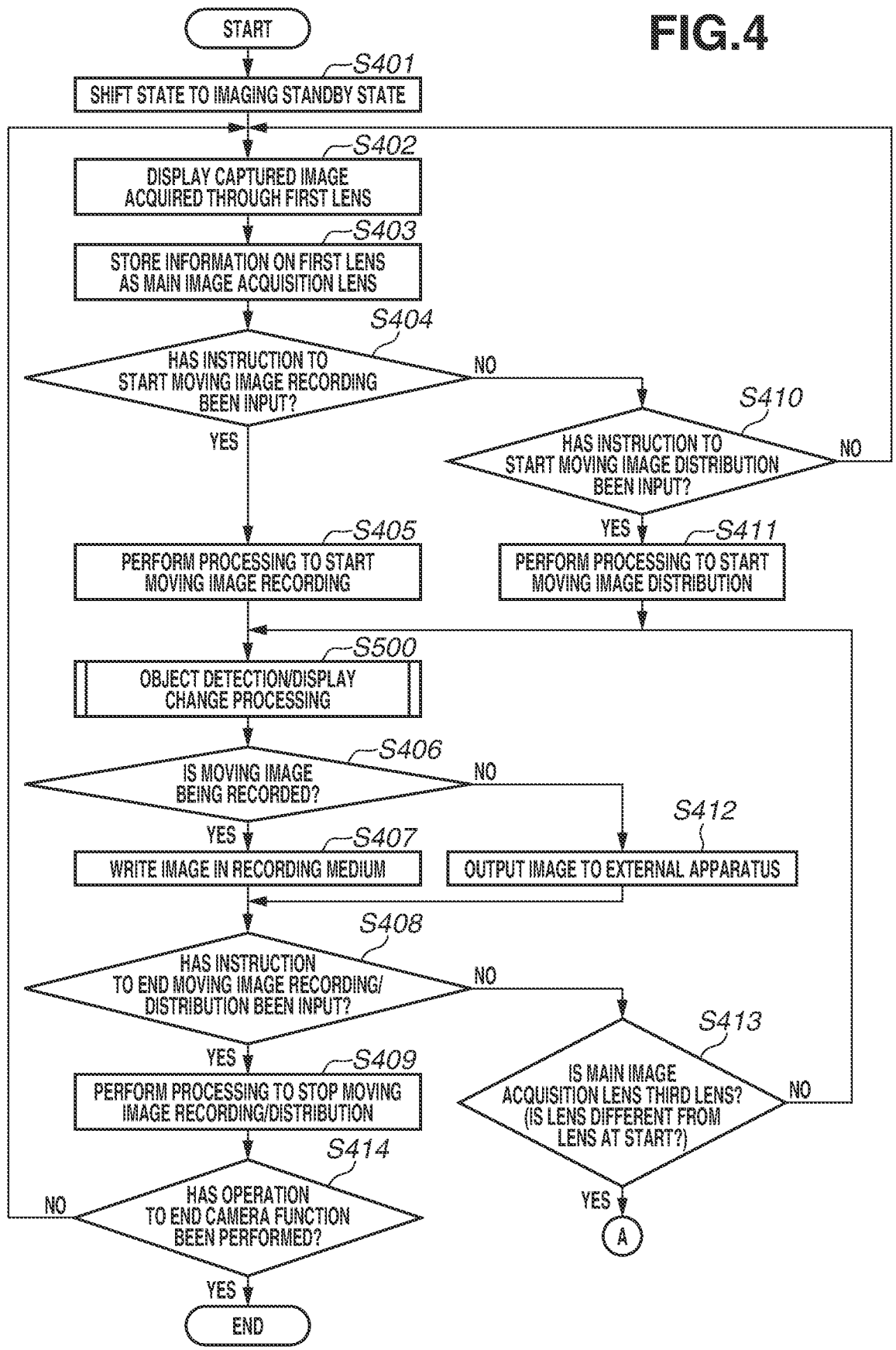
FIG. 4 is a flowchart illustrating control processing according to an exemplary embodiment.

FIG. 4 is a flowchart illustrating control processing to automatically suppress overlapping of the object and the PIP window according to the present exemplary embodiment. The flowchart in FIG. 4 is realized when the CPU 101 executes programs stored in the nonvolatile memory 103. The flowchart in FIG. 4 is started when the function of the smartphone 100 is shifted to a camera function.

In step S401, the CPU 101 starts driving of the rear camera 114, the front camera 115, the rear camera image processing unit 104, and the front camera image processing unit 116, thereby shifting a state to a camera imaging standby state.

In step S402, the CPU 101 displays an LV image acquired through a first lens on the display 105. In the present exemplary embodiment, the LV image acquired through the first lens is an LV image captured by the rear telephoto camera 114a. However, the LV image to be displayed can be an LV image acquired by the rear standard camera 114b, the rear super wide-angle camera 114c, the front standard camera 115a, or the front super wide-angle camera 115b. The photographer can select the LV image captured by the rear camera 114 or the front camera 115 to be displayed on the display 105 from candidates displayed on the display 105 by operating the operation unit 106.

In step S403, the CPU 101 stores information on the camera used to capture a main image on the display 105 in the memory 102. The main image is an image currently displayed as the LV image on the entire display 105, and is an image to be superimposed as a first captured image. In the present exemplary embodiment, information that the rear telephoto camera 114a (first lens) is used is stored in the memory 102.

In step S404, the CPU 101 determines whether an instruction to start moving image recording has been input from the operation unit 106. In a case where the instruction has been input (YES in step S404), the processing proceeds to step S405. Otherwise (NO in step S404), the processing proceeds to step S410.

In step S405, the CPU 101 performs processing to start moving image recording, and the processing then proceeds to step S500.

The processing to start moving image recording includes at least one or more of processing to newly generate a moving image file, processing to record a start time, processing to start recording in the recording medium 108, or the like.

In step S500, the CPU 101 performs object detection/ display change processing. The processing is described below with reference to a flowchart in FIG. 5.

In step S406, the CPU 101 determines whether a moving image is being recorded. In a case where a moving image is being recorded (YES in step S406), the processing proceeds to step S407. Otherwise (NO in step S406), the CPU 101 determines that a moving image is being distributed, and the processing proceeds to step S412.

In step S407, the CPU 101 writes the LV images acquired by the rear camera 114 and the front camera 115 or a combined image as a moving image frame in the recording medium 108 via the recording medium OF 107. At this time, the photographer can select either recording the combined image or separately recording the LV images. In other words, in a case where the combined image in which a second captured image is superimposed on the first captured image is displayed on the display 105 as described below, the photographer can select either recording the combined image as one moving image file or recording the first captured image and the second captured image as different moving image files. The CPU 101 records the LV images or the combined image in a recording format corresponding to selection of the photographer. In a case where the first captured image and the second captured image are recorded as different moving image files, the CPU 101 performs the following recording processing. Even in a case where a combined image in which the second captured image is superimposed on a third captured image is displayed on the display 105 as described below, the CPU 101 continuously records the first captured image and the second captured image as different moving image files.

In step S408, the CPU 101 determines whether an instruction to end the moving image recording or an instruction to end the moving image distribution has been input. In a case where the instruction has been input (YES in step S408), the processing proceeds to step S409. Otherwise (NO in step S408), the processing proceeds to step S413.

In step S409, the CPU 101 stops the moving image recording processing or the moving image distribution processing. The CPU 101 stops the moving image distribution processing by stopping transmission of the moving image to the Internet 111 via the communication OF 110.

In step S410, the CPU 101 determines whether an instruction to start moving image distribution has been input from the operation unit 106. In a case where the instruction has been input (YES in step S410), the processing proceeds to step S411. Otherwise (NO in step S410), the processing returns to step S402. In a case where neither the instruction to start the moving image recording or the instruction to start the moving image distribution have been input in steps S404 and S410, the processing returns to step S402, and the CPU 101 continues the imaging standby state. Alternatively, the CPU 101 can determine to capture a still image and perform processing to capture a still image.

In step S411, the CPU 101 performs processing to start moving image distribution. The processing to start moving image distribution includes at least one or more of connection with the Internet 111 via the communication OF 110, determination of a moving image file transmission destination server, authentication to the moving image file transmission destination server, or the like. The CPU 101 can write the combined image as the moving image frame in the recording medium 108 via the recording medium OF 107 at the same time when the processing to start moving image distribution is performed. At this time, the CPU 101 records the combined image as one moving image file.

In step S412, the CPU 101 transmits the LV images acquired by the rear camera 114 and the front camera 115 or the combined image as the moving image frame to the Internet 111 via the communication OF 110.

In step S413, the CPU 101 determines whether the camera used for main image acquisition is a third lens different from the first lens. In a case where the used lens is the third lens (YES in step S413), the processing proceeds to step S505 in FIG. 5 described below. Otherwise (NO in step S413), the processing returns to step S500.

In step S414, the CPU 101 determines whether operation to end the camera function has been performed on the operation unit 106. In a case where the operation to end the camera function has been performed (YES in step S414), the CPU 101 stops driving of the rear camera 114, the front camera 115, the rear camera image processing unit 104, and the front camera image processing unit 116, thereby ending the camera function. Otherwise (NO in step S414), the processing returns to step S402.

Figure 5:
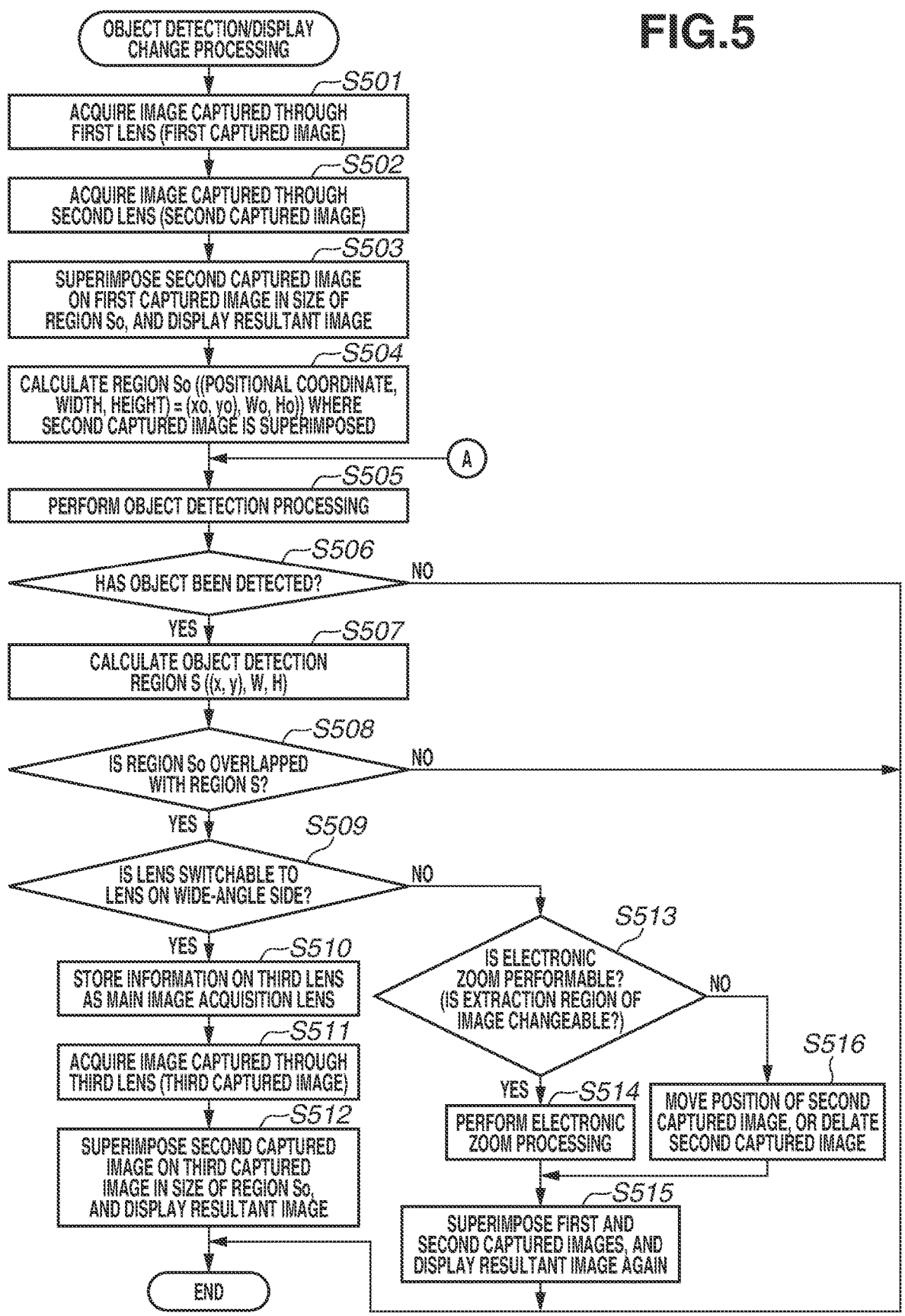
FIG. 5 is a flowchart illustrating object detection/display change processing according to the exemplary embodiment.

FIG. 5 is a flowchart illustrating the object detection/display change processing in step S500 described above.

In step S501, the CPU 101 acquires the LV image captured through the first lens as the first captured image. In the present exemplary embodiment, the LV image captured through the first lens is the LV image captured by the rear telephoto camera 114a.

In step S502, the CPU 101 acquires an LV image captured through a second lens as a second captured image. In the present exemplary embodiment, the LV image captured through the second lens is an LV image captured by the standard front camera 115a.

The first lens and the second lens can be any combination of the cameras of the rear camera 114 and the front camera 115.

In step S503, the CPU 101 superimposes the second captured image on the first captured image in a size of a region So, and displays a resultant image on the display 105 in a PIP mode. In the present exemplary embodiment, the CPU 101 controls the rear telephoto camera image processing unit 104a and the front standard camera image processing unit 116a to generate a combined image in which the second captured image is combined with the first captured image.

In step S504, the CPU 101 calculates a size, a positional coordinate (xo, yo), a width Wo, and a height Ho of the region So where the second captured image is superimposed, and stores the values in the memory 102.

Processing in steps S503 and S504 can be performed at any timing before start of the moving image recording or before start of the moving image distribution.

In step S505, the CPU 101 controls the rear camera image processing unit 104 or the front camera image processing unit 116 to perform object detection processing for detecting an object in the first captured image. In the present exemplary embodiment, the CPU 101 controls the rear telephoto camera image processing unit 104a to perform the object detection processing based on the LV image acquired by the rear telephoto camera 114a.

In step S506, the CPU 101 determines whether the object has been detected based on a result of the object detection processing. In a case where the CPU 101 determines that the object has been detected (YES in step S506), the processing proceeds to step S507. Otherwise (NO in step S506), the processing in step S500 ends.

In step S507, the CPU 101 controls the rear camera image processing unit 104 or the front camera image processing unit 116 to calculate a size, a positional coordinate (x, y), a width W, and a height H of an object detection region S in the first captured image, and stores the values in the memory 102. In the present exemplary embodiment, the CPU 101 controls the rear telephoto camera image processing unit 104a to calculate the object detection region S in the LV image acquired by the rear telephoto camera 114a. As described below, in a case where the main image acquisition lens is changed to the third lens (in present exemplary embodiment, rear standard camera 114b or rear super wide-angle camera 114c), the object detection region S is changed to an object detection region S' having a positional coordinate (x', y'), a width W', and a height H'. In other words, in the present exemplary embodiment, in a case where the processing proceeds from step S413 in FIG. 4 to steps S505, S506, and S507, the CPU 101 controls the standard camera image processing unit 104b or the super wide-angle camera image processing unit 104c to calculate the object detection region S'.

In step S508, the CPU 101 determines whether the region So where the second captured image is superimposed overlaps with the object detection region S. In a case where the CPU 101 determines that the region So overlaps with the object detection region S (YES in step S508), the processing proceeds to step S509. Otherwise (NO in step S508), the processing in step S500 ends.

In the case where the CPU 101 determines that the region So overlaps with the object detection region S, the processing may not immediately proceed to step S508, and processing to perform comparison with a threshold as described below may be performed.

First processing is processing to compare an overlapping area with a threshold. More specifically, the CPU 101 determines whether an overlapping area of the region So where the second captured image is superimposed and the object detection region S is greater than or equal to a predetermined first threshold. In a case where the CPU 101 determines that the overlapping area is greater than or equal to the predetermined first threshold, the processing proceeds to step S509. Otherwise, the processing in step S500 ends.

Second processing is processing to compare an overlapping time with a threshold. More specifically, the CPU 101 determines whether a time when the region So where the second captured image is superimposed overlaps with the object detection region S is greater than or equal to a predetermined second threshold. In a case where the CPU 101 determines that the time is greater than or equal to the predetermined second threshold, the processing proceeds to step S509. Otherwise, the processing in step S500 ends.

In step S509, the CPU 101 determines whether the camera is switchable to a camera having a lens wider in angle of view. More specifically, the CPU 101 determines whether the camera is switchable to, among a plurality of cameras provided on the surface provided with the camera currently acquiring the first captured image, a camera having a lens wider in angle of view than the lens of the camera acquiring the first captured image. For example, in a case where the first captured image is currently acquired using the rear telephoto camera 114a, the CPU 101 determines that the camera is switchable to a camera having a lens wider in angle of view because the camera is switchable to the rear standard camera 114b or the rear super wide-angle camera 114c as the camera having the lens wider in angle of view. In contrast, in a case where the first captured image is currently acquired using the rear super wide-angle camera 114c, the CPU 101 determines that the camera is not switchable to the camera having the lens wider in angle of view because a camera having a lens wider in angle of view than the lens of the rear super wide-angle camera 114c is not present. In this example, the case where the first captured image is the image captured by the rear camera 114 is described, but even in a case where the first captured image is the image captured by the front camera 115, the determination is similarly performable.

In a case where the CPU 101 determines that the camera is switchable to the camera having the lens wider in angle of view (YES in step S509), the processing proceeds to step S510. Otherwise (NO in step S509), the processing proceeds to step S513.

In step S510, the CPU 101 changes information on the camera used to capture the main image on the display 105 to information on the camera having the lens wider in angle of view that is determined to be switchable, and stores the information in the memory 102. In the present exemplary embodiment, the information is changed to information on the rear standard camera 114b (third lens), and the information is stored in the memory 102.

In step S511, the CPU 101 acquires an LV image captured through the third lens as the third captured image. In the present exemplary embodiment, the LV image captured through the third lens is an LV image captured by the rear standard camera 114b.

In step S512, the CPU 101 superimposes the second captured image on the third captured image in the size of the region So, and displays a resultant image on the display 105 in the PIP mode. In the present exemplary embodiment, the CPU 101 controls the standard camera image processing unit 104b and the front standard camera image processing unit 116a to generate a combined image in which the second captured image is combined with the third captured image.

In the present exemplary embodiment, the case where, in the series of processing in steps S509 to S512, the LV image captured through the third lens is the LV image captured by the rear standard camera 114b is described. In a case where the CPU 101 determines that the camera is switchable to the rear super wide-angle camera 114c, the LV image can be acquired by switching the camera to the rear super wide-angle camera 114c.

In step S513, the CPU 101 determines whether an extraction region of the first captured image is changeable, namely, whether the angle of view is changeable to the wide-angle side by the electronic zoom. In a case where the CPU 101 determines that the extraction region is changeable (YES in step S513), the processing proceeds to step S514. Otherwise (NO in step S513), the processing proceeds to step S516.

In step S514, the CPU 101 changes the extraction region of the first captured image, namely, performs electronic zoom processing. In the present exemplary embodiment, the CPU 101 controls the rear telephoto camera image processing unit 104a to perform processing to change the extraction region of the LV image acquired by the rear telephoto camera 114a.

In step S515, the CPU 101 superimposes the second captured image on the first captured image including the changed extraction region in the size of the region So, and displays a resultant image on the display 105 in the PIP mode.

In step S516, the CPU 101 changes the superimposing position of the second captured image on the first captured image. At this time, the CPU 101 changes the position of the second captured image to any one of four corners of the first captured image. The CPU 101 may not perform the processing to change the position of the second captured image, and can delete (hide) the second captured image from the display 105 and display at least one of the first captured image and the third captured image on the display 105.

Figure 6A:
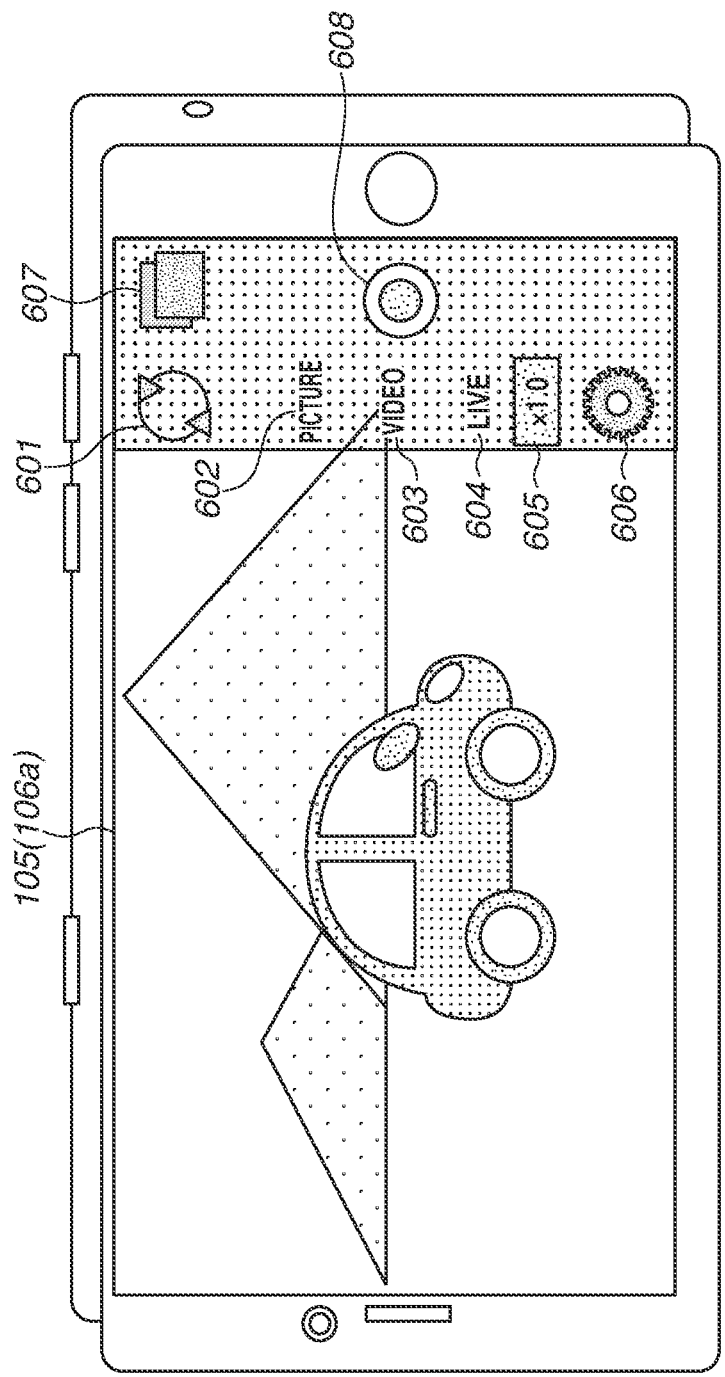

FIGS. 6A and 6B are diagrams respectively illustrating a moving image capturing/recording screen and an image display setting screen on the smartphone according to the present exemplary embodiment.

FIG. 6A is a diagram illustrating a screen example when the photographer selects the camera function of the smartphone 100 by using the operation unit 106 and the smartphone 100 is put into the imaging standby state.

When the photographer performs a "touch-down" on any of icons 601 to 608 displayed on the display 105 by using the touch panel 106a, a corresponding setting or function can be activated. Performing a "touch-down" on the icon 601 enables switching the rear camera 114 and the front camera 115 used to acquire the LV image to be displayed on the display 105.

The icons 602 to 604 each represent an imaging function. A still image capturing function is activated in response to a "touch-down" on a "picture" character icon 602, a moving image capturing function is activated in response to a "touch-down" on a "video" character icon 603, and a moving image distribution function to the Internet 111 is activated in response to a "touch-down" on a "LIVE" character icon 604. A magnification icon 605 represents a current magnification. Performing a "touch-down" on the magnification icon 605 enables switching the magnification of the rear camera 114 or the front camera 115 currently used. The camera can be switched to the rear telephoto camera 114a when the magnification is increased to a certain threshold or more, whereas the camera can be switched to the rear super wide-angle camera 114c when the magnification is reduced to a certain threshold or less. Likewise, the front camera 115 can be switched to the front super wide-angle camera 115b when the magnification is reduced to a certain threshold or less. The magnification can be switched to the wide-angle side in response to a "pinch-in" on the touch panel 106a, and the magnification can be switched to the telephoto side in response to a "pinch-out", without performing a "touch-down" on the magnification icon 605.

The icon 606 represents a camera setting function. When the photographer performs a "touch-down" on the icon 606, the screen is shifted to a screen to set a moving image recording system, a moving image distribution destination, and the like. When the photographer performs a "touch-down" on the icon 607, a screen display system can be set. Details of the operation are described below with reference to FIG. 6B. When the photographer performs a "touch-down" on the icon 608, a still image is captured and stored in a case where the still image capturing function is activated, recording of a moving image is started/stopped in a case where the moving image capturing function is activated, and moving image distribution can be started/stopped in a case where the moving image distribution function is activated.

The operation can be performed using at least one of the buttons of the operation unit 106 without being limited to the touch panel 106a.

FIG. 6B is a diagram illustrating a screen display mode setting screen shifted in response to a "touch-down" of the icon 607. Options 609 indicate display modes of the LV images, and the photographer can select a desired display mode in imaging by performing a "touch-down" on the corresponding option 609. For example, an option 609a represents that the rear telephoto camera 114a and the front standard camera 115a are used for the PIP imaging. When the option 609a is selected, the LV images are acquired by the rear telephoto camera 114a and the front standard camera 115a, and the LV images are displayed in a PIP window mode by superimposing the LV image acquired by the front standard camera 115a on the LV image acquired by the rear telephoto camera 114a. The options 609 can be set together for images to be displayed on the screen and for the image used for moving image recording/moving image distribution, or can be separately set such that the images are displayed on the screen in the PIP window mode, but only the LV image by the rear telephoto camera 114a is used for moving image recording/moving image distribution.

The options 609 are not limited to combinations illustrated in FIG. 6B. For example, two cameras of the rear camera 114 can be used in combination, or the LV image acquired by the rear camera 114 can be superimposed on the LV image acquired by the front camera 115.

Figure 7A:
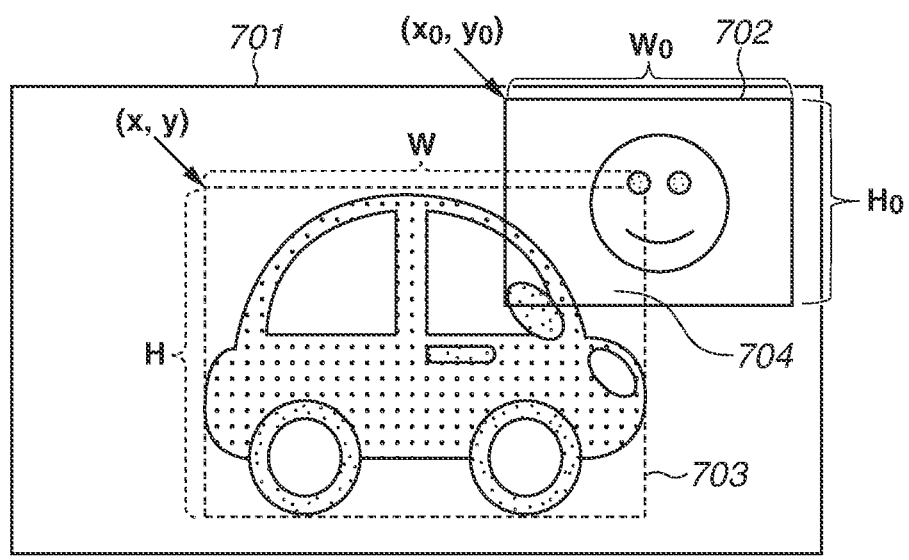
FIGS. 7A and 7B are diagrams each illustrating relationship between an object and a display region of a picture-in-picture (PIP) window.
Figure 7B:
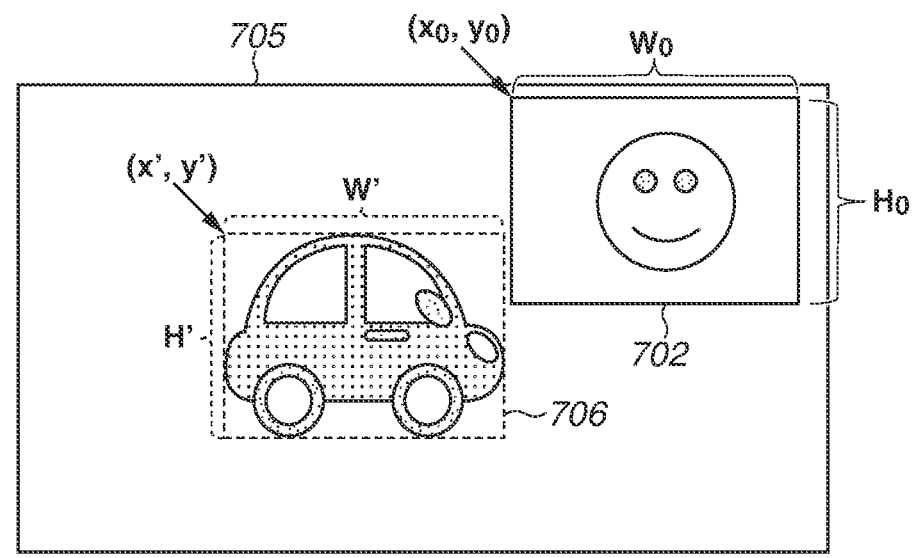

FIGS. 7A and 7B are diagrams each illustrating relationship of the object and a display region of the PIP window. FIG. 7A is a diagram illustrating an example in which an LV image 701 acquired by the rear telephoto camera 114a is displayed on the display 105.

The coordinate (xo, yo), the width Wo, and the height Ho are calculated to superimpose an LV image acquired by the front standard camera 115a on the LV image 701 in a size of the region So (702 in FIGS. 7A and 7B) illustrated by a thick line.

The object detection region S (703 in FIG. 7A) illustrated by a dashed line is a region where the object is detected by the rear telephoto camera image processing unit 104a and a size of the object is calculated in steps S505 to S507.

In FIG. 7A, as an example, calculation is performed on the assumption that the positional coordinate (x, y) of the object is at an upper left, but the positional coordinate at any position in the object detection region S (703 in FIG. 7A) can be used. The width W and the height H are calculated in order to calculate a size of the object detection region S (703 in FIG. 7A) as a rectangle, but the rectangle of the region is not limited thereto, and any method can be used as long as the size of the object can be calculated.

In this example, when the LV image acquired by the front standard camera 115a is superimposed on the LV image 701 in the region So (702 in FIGS. 7A and 7B), namely, is displayed in the PIP window mode, a part of the region So and a part of the object detection region S overlap with each other in an overlapping region 704.

An LV image 705 in FIG. 7B is acquired in a manner that the CPU 101 determines overlapping in step S508, and switches the camera from the rear telephoto camera 114a to the rear standard camera 114b or the rear super wide-angle camera 114c. The LV image 705 can be an image obtained by performing electronic zoom processing on the LV image acquired by the rear telephoto camera 114a. The angle of view is changed by switching of the rear camera 114 or the electronic zoom processing. Accordingly, the object detection region S (706 in FIG. 7B) is smaller than the object detection region S (703 in FIG. 7A) in FIG. 7A.

The positional coordinate (x', y'), the width W', and the height H' of the object are calculated again to acquire the LV image 705. The CPU 101 performs the processing in steps S508 to S516 until the overlapping region 704 in FIG. 7A is eliminated by switching of the rear camera 114 or the electronic zoom processing. In a case where after the processing is performed to eliminate the overlapping region 704 once but the overlapping region 704 appears again, the processing in steps S508 to S516 can be repeated.

As described above, according to the present exemplary embodiment, in the case where the object and the captured image (PIP window) to be superimposed overlap with each other as in FIG. 7A, the CPU 101 changes the angle of view by switching the camera to the rear camera 114 on the wide-angle side or the front camera on the wide-angle side. Displaying the object and the PIP window so as not to overlap with each other enables capturing the entire object. Accordingly, it is possible to improve visibility of the object. It is unnecessary for the photographer to suspend the desired imaging or the desired distribution and to operate the angle of view on the operation unit 106. In this way, the photographer can concentrate on the desired imaging or the desired distribution.

In the above-described present exemplary embodiment, a smartphone was used as an example of the electronic apparatus. This is not seen to be limiting, and the present exemplary embodiment is applicable to any electronic apparatus including a plurality of lenses different in angle of view. In other words, the present exemplary embodiment is applicable to, for example, a personal computer, a personal digital assistant (PDA), a digital camera, a portable image viewer, a digital photo frame, a music player, a game machine, an electronic book reader, and the like.

While the present disclosure is described in detail based on an exemplary embodiment, this exemplary embodiment is not seen to be limiting, and various modes that enable practice of the above-described features are applicable.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the above-described exemplary embodiments have been described, they are not seen to be limiting. The scope of the following claims is to be accorded the broadest interpretation so as to encompass all such modifications and equivalent structures and functions.

This application claims the benefit of Japanese Patent Application No. 2022-029380, filed Feb. 28, 2022, which is hereby incorporated by reference herein in its entirety.

What is claimed is:

1. An electronic apparatus comprising:
a plurality of lenses, each having different angles of view;
a processor; and
a memory storing a program which, when executed by the processor, causes the electronic apparatus to:
acquire a first captured image captured using a first lens from among the plurality of lenses;
acquire a second captured image captured using a second lens from among the plurality of lenses, wherein the second lens is different from the first lens;
acquire a third captured image captured using a third lens from among the plurality of lenses, wherein the third lens is wider in angle of view than the first lens;
superimpose the second captured image on the first captured image;
detect an object from the first captured image;
generate a combined image where the second captured image is superimposed on the first captured image in a case where a region of the detected object does not overlap with a region where the second captured image is superimposed; and
generate a combined image where the second captured image is superimposed on the third captured image in a case where the region of the detected object overlaps with the region where the second captured image is superimposed,
wherein, the combined image is caused to be displayed where the second captured image is superimposed on the first captured image or the combined image where the second captured image is superimposed on the third captured image, and the first captured image is caused to be displayed without superimposing the second captured image in a case where the third captured image is not acquirable.

2. The electronic apparatus according to claim 1, wherein the first lens and the third lens are provided on a first surface of the electronic apparatus, and
wherein the second lens is provided on a second surface different from the first surface.

3. The electronic apparatus according to claim 1, wherein, when the program is executed by the processor, the program further causes the electronic apparatus to record the first captured image in a recording medium regardless of whether the combined image where the second captured image is superimposed on the first captured image is generated or the combined image where the second captured image is superimposed on the third captured image is generated.

4. The electronic apparatus according to claim 1, wherein, when the program is executed by the processor, the program further causes the electronic apparatus to output the combined image where the second captured image is superimposed on the first captured image or the combined image where the second captured image is superimposed on the third captured image from the electronic apparatus.

5. The electronic apparatus according to claim 1, wherein, when the program is executed by the processor, the program further causes the electronic apparatus to record the combined image where the second captured image is superimposed on the first captured image or the combined image where the second captured image is superimposed on the third captured image in a recording medium.

6. The electronic apparatus according to claim 1, wherein the combined image where the second captured image is superimposed on the third captured image is generated in a case where an overlapping area of the region of the detected object and the region where the second captured image is superimposed is greater than or equal to a predetermined first threshold.

7. The electronic apparatus according to claim 1, wherein the combined image where the second captured image is superimposed on the third captured image is generated in a case where a time when the region of the detected object overlaps with the region where the second captured image is superimposed is greater than or equal to a predetermined second threshold.

8. The electronic apparatus according to claim 1, wherein, when the program is executed by the processor, the program further causes the electronic apparatus to generate a combined image by moving the region where the second captured image is superimposed in a case where the third captured image is not acquirable.

9. A method of controlling an electronic apparatus including a plurality of lenses each having different angles of view, the method comprising:

acquiring a first captured image captured using a first lens from among the plurality of lenses;
acquiring a second captured image captured using a second lens from among the plurality of lenses, wherein the second lens is different from the first lens;
acquiring a third captured image captured using a third lens from among the plurality of lenses, wherein the third lens is wider in angle of view than the first lens;
superimposing the second captured image on the first captured image;
detecting an object from the first captured image;
generating a combined image where the second captured image is superimposed on the first captured image in a case where a region of the detected object does not overlap with a region where the second captured image is superimposed; and
generating a combined image where the second captured image is superimposed on the third captured image in a case where the region of the detected object overlaps with the region where the second captured image is superimposed; and
displaying the combined image where the second captured image is superimposed on the first captured image or the combined image where the second captured image is superimposed on the third captured image, and displaying the first captured image without superimposing the second captured image in a case where the third captured image is not acquirable.

10. A non-transitory computer-readable medium that stores a program, which when executed causes an electronic apparatus including a plurality of lenses each having different angles of view to execute a method, the method comprising:
acquiring a first captured image captured using a first lens from among the plurality of lenses;
acquiring a second captured image captured using a second lens from among the plurality of lenses, wherein the second lens is different from the first lens;
acquiring a third captured image captured using a third lens from among the plurality of lenses, wherein the third lens is wider in angle of view than the first lens;
superimposing the second captured image on the first captured image;
detecting an object from the first captured image;
generating a combined image where the second captured image is superimposed on the first captured image in a case where a region of the detected object does not overlap with a region where the second captured image is superimposed; and
generating a combined image where the second captured image is superimposed on the third captured image in a case where the region of the detected object overlaps with the region where the second captured image is superimposed; and
displaying the combined image where the second captured image is superimposed on the first captured image or the combined image where the second captured image is superimposed on the third captured image, and displaying the first captured image without superimposing the second captured image in a case where the third captured image is not acquirable.

* * * * *